Jan. 6, 1942. T. B. CHACE 2,268,566
MOLD FOR PRODUCING COMPOSITE METAL STOCK
Filed May 10, 1940
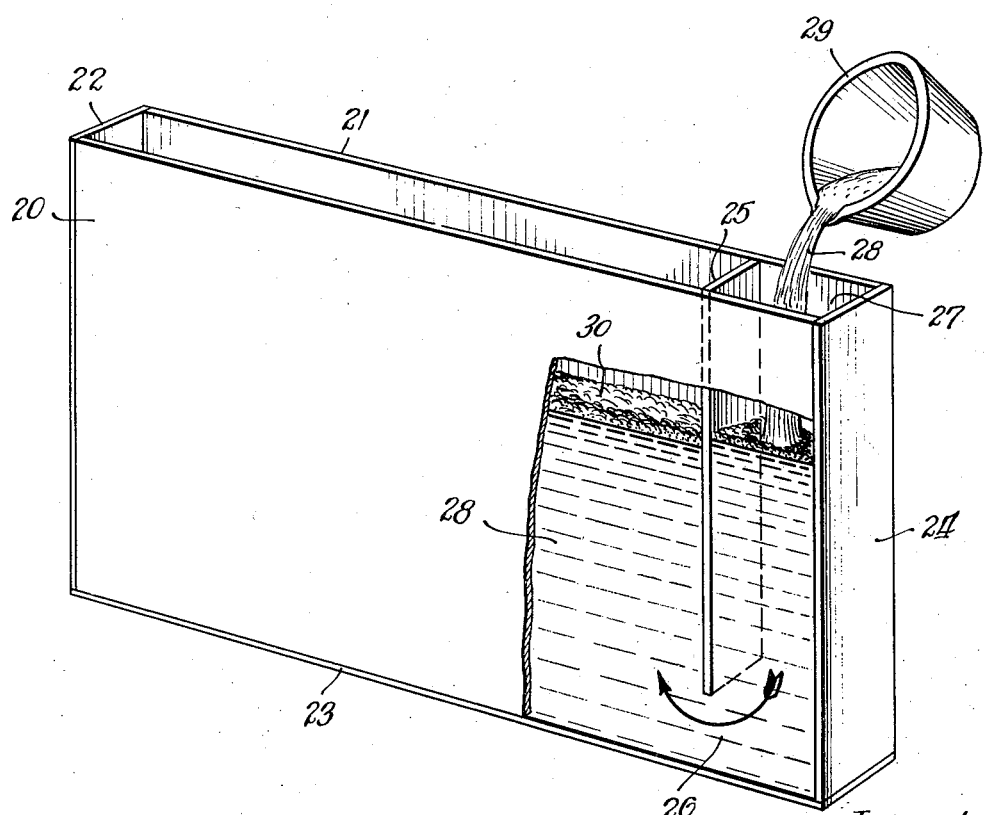
Inventor:
Thomas B. Chace.

Patented Jan. 6, 1942

2,268,566

UNITED STATES PATENT OFFICE 2,268,566

MOLD FOR PRODUCING COMPOSITE METAL STOCK

Thomas B. Chace, Winnetka, Ill., assignor to Clad Metals Industries, Inc., Chicago, Ill., a corporation of Illinois Application May 10, 1940, Serial No. 334,302

3 Claims. (Cl. 22—116)

My invention relates, generally, to methods of and means for manufacturing composite metal slabs, and it has particular relation to the manufacture of such slabs that are suitable for rolling and drawing to form sheets.

An object of my invention is to bond two slabs or plates of metal together by a bonding metal having a melting temperature lower than that of either or both.

Another object of my invention is to provide for bonding together a pair of corrosion resisting metallic slabs that are spaced apart a distance which is substantially greater than their combined thickness by a bonding metal having a relatively high heat conductivity.

Still another object of my invention is to provide for bottom pouring in a mold that is formed in part by a pair of spaced apart corrosion resisting metal slabs.

Other objects of my invention will, in part, be obvious, and in part appear hereinafter.

My invention, accordingly, is disclosed in the embodiment thereof shown in the accompanying drawing, and it comprises features of construction and method steps which will be exemplified hereinafter, and the scope of the application of which will be indicated in the appended claims.

For a more complete understanding of the nature and scope of my invention, reference may be had to the following detailed description, taken in connection with the accompanying drawing, which is an isometric side view, partly broken away, of a partially formed composite slab showing the manner of producing it in accordance with my invention.

Referring now to the drawing, it will be observed that I have there shown the manner in which a composite slab may be formed having facing portions widely spaced apart with a bonding metal filling the space therebetween. In this slab the facing slabs are formed of metals having high melting points and the bonding metal has a relatively low melting point. As illustrated, facing slabs 20 and 21 are provided, and they may be composed of non-tarnishing alloy, the composition of which is approximately 16% chromium, remainder iron. This alloy is particularly desirable for the manufacture of such products as cooking utensils, but it is very inefficient as a heat conductor because of its low heat conductivity. Moreover, it is expensive. However, it is practical to employ this expensive material when the space between is formed of a relatively inexpensive material, such as copper shown at 28 in the molten state. Preferably the facing slabs 20 and 21 form about 10% to 20% of the total thickness of the composite slab, and they are so spaced as to leave about 80% to 90% of the total thickness of the composite slab as the mold opening.

Since the space between the facing slabs 20 and 21 is to be filled with molten metal having a relatively high heat conductivity, thin steel strips 22, 23, and 24 are welded on the corresponding ends and the bottom of the facing slabs 20 and 21 so as to provide a liquid-tight mold space. Obviously a single strip may be employed in place of the three strips 22, 23, and 24.

With a view to forming a pouring sprue at one end of the mold space, a metal separating strip 25 is welded adjacent one end thereof to the opposing faces of the slabs 20 and 21 and substantially parallel to the strip 24. The lower end of the separating strip 25 is spaced as indicated at 26 from the bottom of the mold space or the upper surface of the strip 23 so as to provide for bottom pouring of the molten metal into the main mold space. It will now be apparent that the separating strip 25 together with the strip 24 and the adjacent faces of the slabs 20 and 21 together form a pouring sprue which is indicated at 27.

Molten metal 28, preferably copper which has a relatively high heat conductivity, is poured from a suitable ladle 29 into the sprue 27 from the bottom of which it flows through the space 26, as indicated, into the main portion of the mold space. This arrangement prevents splashing of the inner faces of the slabs 20 and 21 and permits the welding flux, oxides, and non-metallics, indicated at 30, to freely float to the top.

After the high heat conductivity metal which is poured into the mold space formed as indicated in the drawing has solidified, the resulting composite slab is then rolled to the desired thickness. The edges of the rolled strip are then trimmed off as may be necessary in order to remove the scrap.

Since changes may be made in the foregoing described constructions and methods, and different embodiments of the invention may be made without departing from the scope thereof, it is intended that all matter contained in the above description or shown in the accompanying drawing shall be interpreted as illustrative and not in a limiting sense.

I claim as my invention:

1. A mold comprising a pair of relatively thin slabs of corrosion resisting metal in parallel relation and spaced apart a distance appreciably greater than the combined thickness thereof, metal strip means along adjacent edges of said slabs and secured thereto in liquid-tight relation, and a metal separating strip extending between the opposing faces of said slabs adjacent one end of the space therebetween substantially parallel to said metal strip means thereat for forming therewith a pouring sprue, the lower end of said separating strip being spaced from the bottom of the space between said slabs to permit bottom pouring of molten metal thereinto, said slabs having their facing surfaces cleaned and fluxed for bonding to form a fusion bond with molten copper.

2. A mold comprising a pair of relatively thin slabs of corrosion resisting metal in parallel relation and spaced apart a distance appreciably greater than the combined thickness thereof, metal strip means along adjacent edges of said slabs and closing two sides and the bottom of the space between said slabs and secured thereto in liquid-tight relation, and a metal separating strip extending between the opposing faces of said slabs adjacent one end of the space therebetween substantially parallel to said metal strip means thereat for forming therewith a pouring sprue, the lower end of said separating strip being spaced from the bottom of the space between said slabs to permit bottom pouring of molten metal thereinto, said slabs having their facing surfaces cleaned and fixed for bonding to form a fusion bond with molten copper.

3. A mold for producing composite metal stock suitable for cooking utensils, consisting of a pair of vertically disposed plates of non-tarnishing chromium-iron alloy separated by a mold space of approximately 80% to 90% of the total thickness of the resultant slab, said plates being of a thickness of approximately 5% to 10% of the total thickness of the resultant slab, strip stock of a melting point not substantially below that of said plates welded to the edges of said plates to provide a closed liquid containing mold space between the plates which is adapted to be filled with molten copper to produce a composite slab, the facing surfaces of said plates being cleaned and fluxed for bonding to form a fusion bond with molten copper, and a metal separating strip extending between the opposing faces of said plates adjacent one end of the space therebetween substantially parallel to said metal strip means thereat for forming therewith a pouring sprue, the lower end of said separating strip being spaced from the bottom of the space between said plates to permit bottom pouring of molten metal thereinto.

THOMAS B. CHACE.